(12) United States Patent
Höhnel

(10) Patent No.: US 7,064,590 B2
(45) Date of Patent: Jun. 20, 2006

(54) OPTION FOR INDEPENDENTLY ADJUSTING THE TIMING OF THE FORWARD AND REVERSE DIRECTION OF BI-DIRECTIONAL DIGITAL SIGNALS

(75) Inventor: Falk Höhnel, München (DE)

(73) Assignee: Siemens Aktiengesellschaft, Munich (DE)

( * ) Notice: Subject to any disclaimer, the term of this patent is extended or adjusted under 35 U.S.C. 154(b) by 138 days.

(21) Appl. No.: 10/489,078

(22) PCT Filed: Aug. 30, 2002

(86) PCT No.: PCT/EP02/09694

§ 371 (c)(1),
(2), (4) Date: Mar. 5, 2004

(87) PCT Pub. No.: WO03/023580

PCT Pub. Date: Mar. 20, 2003

(65) Prior Publication Data

US 2004/0232959 A1    Nov. 25, 2004

(30) Foreign Application Priority Data

Sep. 6, 2001  (EP)  .................... 011214012

(51) Int. Cl.
*H03L 7/00* (2006.01)
(52) U.S. Cl. ...................................... 327/141; 713/401
(58) Field of Classification Search ................. 713/401
See application file for complete search history.

(56) References Cited

U.S. PATENT DOCUMENTS

| 5,742,798 | A  | * | 4/1998 | Goldrian | ...................... 713/400 |
| 5,859,550 | A  | * | 1/1999 | Brandt | ........................ 327/156 |
| 6,003,118 | A  |   | 12/1999 | Chen | ............................. 711/167 |
| 6,292,521 | B1 | * | 9/2001 | Lai et al. | ..................... 375/357 |

* cited by examiner

*Primary Examiner*—Minh Nguyen

(57) ABSTRACT

It is difficult to optimize the timing of the forward and reverse direction for high frequency bi-directional digital signals. Therefore, a digital system is provided that improves the adjustability of the timing by the emission of an additional clock pulse, together with the output clock pulse for the receiver and the feedback clock pulse for the PLL. The additional clock pulse is re-circulated using a delay line and is used to set the clock pulse of the reverse direction signals.

10 Claims, 4 Drawing Sheets

OPTION FOR INDEPENDENTLY ADJUSTING THE TIMING OF THE FORWARD AND REVERSE DIRECTION OF BI-DIRECTIONAL DIGITAL SIGNALS

CROSS REFERENCE TO RELATED APPLICATIONS

This application is the US National Stage of International Application No. PCT/EP02/09694, filed Aug. 30, 2002 and claims the benefit thereof. The International Application claims the benefits of European application No. 01121401.2 EP filed Sep. 6, 2001, both of the applications are incorporated by reference herein in their entirety.

FIELD OF INVENTION

The invention relates to a delayed clocking of signals in the reverse direction without strobe signals also being supplied. Additionally, the invention improves the adjustability of the timing by the emission of an additional clock pulse, together with the output clock pulse for the receiver and the feedback clock pulse for the PLL.

BACKGROUND OF INVENTION

The performance of digital systems is heavily dependent on the frequency. On the other hand, the higher the frequency, the shorter is the time remaining to convey digital signals reliably from a driver via a conductor track to the receivers. Limiting factors are the clock-to-output time (tco), the run time on the board (trun), the setup/hold time (tsetup/thold) of the receiver, output and input skew (skew of the transmitters and receivers) and clock skew or jitter (tskew).

FIG. 1 shows the timing of a digital signal at the output of the driver of a transmitter and at the input of the receiver, the diagram illustrating the time effect of the factors mentioned.

The setup time requirement determines for how many ns before the clock edge a signal to be clocked in has to be stable. The hold time requirement determines for how long after a clock edge the signal has to remain stable. Thus, if the position of the times of clock and signal with respect to each other is varied, this has a positive effect in respect of one requirement, but a negative effect in respect of the other requirement. The run time of clock and signals must be optimized in such a way that even in extreme environmental conditions positive margins remain and no timing violations arise anywhere. The tradeoff determines the maximum possible frequency and therefore the performance of the system or imposes constraints in the architecture.

With bidirectional signals, the optimization is even more difficult. If, for example, a relatively large run time arises in any case due to a great distance between transmitter and receiver, complying with the hold time is no problem.

On the other hand this probably gives rise to a problem with regard to the setup time. With unidirectional signals a means of optimizing could be to allow the clock of the receivers to trail behind somewhat relative to the clock of the transmitter. In this way more time is gained for setup and the amply available hold time is reduced. The clock period is lengthened somewhat for this direction.

With bidirectional signals this is impossible. In the opposite direction the receiver clock would then in fact be leading the transmitter clock. The clock period would be shortened. Moreover this would happen in spite of the fact that the distance for the signals is actually the same. Each change in favor of one direction is detrimental to the timing of the other direction.

For simple digital circuits, no solution at all was found for this problem. Generally measures are taken to ensure that the two transmitters/receivers involved have as little clock skew as possible. In this way the timing budget for both direction is the same. An optimization in favor of one direction was possible only if the two devices differed in the setup/hold or clock-to-output values according to the data sheet.

Typically, a table is produced which lists all the timing parameters to be taken into account for each signal and for both directions and calculates a margin or a violation.

TABLE 1

Setup and hold time margin calculation (for one direction; another table for reverse direction)

| signal name | tskew chip | tco, min | tco, max | trun, min | trun, max | tsetup | thold | hold margin | setup margin |
|---|---|---|---|---|---|---|---|---|---| hold margin = tco, min + trun, min − tskew − thold
setup margin = 7.5 ns − tco, max − trun, max − tsetup − tskew
(clock period = 7.5 ns)

In special digital systems (e.g. RAMBUS or DDR SDRAM), measures are taken to ensure that the signals are not clocked in using the centrally distributed clock, but are clocked in with a delay by means of the clock signals also supplied, which are known as strobe signals. This presupposes that the devices involved also supply these strobe signals. Simpler circuits do not have this possibility.

An already partly common variant for minimizing the clock skew between transmitter and receiver, which is shown in FIG. 2, uses a PLL in the transmitter device (e.g. SDRAM controller). In this arrangement, clock and signals for the SDRAMs come from the same chip. An additional clock output is looped back again to the PLL of the transmitter and in fact has the same physical length as the SDRAM clocks. The PLL transmits this feedback clock earlier in line with the board run time, so that in this way it will then arrive in phase with the reference clock at the PLL input of the SDRAM controller. Because the clocks have the same run time to the SDRAM these are also automatically in phase at their receivers.

SUMMARY OF INVENTION

The invention provides a digital system, comprising a processing core device for processing data which is clocked via a first clock signal, a data output register for transmitting data over a data signal line to a further digital system, a data input register for receiving data via the data signal line, a PLL device which generates a second clock signal from the first clock signal, whereby the feedback loop of the PLL device has the same run time as the data signal line, wherein the second clock signal is supplied as a clock signal to the further digital system via a first clock line, whereby the first clock line baa the same physical length as the data signal line and contains a delay device by means of which the run time over the first clock line can be varied, and the second clock signal is supplied as a clock signal to the data input register via a second clock line, whereby the second clock line contains a delay device by means of which the run time over the second clock line can be varied.

The invention further provides a digital system, comprising a processing core device for processing data which is clocked via a first clock signal, a data output register for transmitting data over a data line to a further digital system, a data input register for receiving data via the data line, a PLL device which generates a second clock signal from the first clock signal, a first delay device (delay 1) which is disposed in a first clock line between the digital system and the further digital system and has the effect of enabling the delivery of the second clock signal to the further digital system to be delayed by a first time interval, a second delay device (delay 2) which is disposed in a second clock line and has the effect of enabling the delivery of the second clock signal to the data input register of the digital system to be delayed by a second time interval, a third delay device (delay 3) which is disposed in the feedback loop of the PLL device has the effect of enabling the second clock signal to be shifted so as to be leading in time by a third time interval with respect to the first clock signal.

In an embodiment of the inventive digital system the feedback loop of the PLL device can contain a delay device by means of which the run time of the feedback loop of the PLL device can be varied.

In a further embodiment of the inventive digital system the second clock line can have the same physical length as the data signal line.

In a further embodiment of the inventive digital system the second clock signal can be supplied as a clock signal to the data output register.

In a further embodiment of the inventive digital system the run times within the digital system and the buffer types of clock signals and data signals can be kept identical.

The invention enables a delayed clocking in of the signals of the reverse direction without strobe signals also being supplied. By means of suitable delay lines on the board it is possible to set the signal clock-in timing for forward and reverse direction independently of each other. The timing of the entire bus system can also be adjusted. This enables the maximum frequency to be increased or the bus frequency to be operated with fewer restrictions. The design risk for the timing is considerably reduced because it can still be changed on the finished board by insertion of other delay lines.

The invention is based on the above described PLL clock system for minimizing clock skew. An important idea of the invention consists in the transmission of a further clock together with the output clock for the receivers and the feedback clock for the PLL. This further clock is looped back via a delay line and used for clocking in the signals in the reverse direction. Delay lines are also provided in the feedback clock of the PLL and in the receiver clock path. By insertion of different delay lines the times of clocking out and clocking in at the transmitter and the clock of the receivers can be set arbitrarily within limits (see FIG. 3).

Furthermore, the timing can be improved and external influences minimized by coupling the output signals to the output clock. This coupling is achieved as follows: the output data register is clocked not with the normal system clock for the core of the ASIC, but with the clock which is derived from the output clock of the PLL (see FIG. 4). Finally, in order to minimize external influences, buffer type and placing of clock and signal output buffers are implemented identically.

DETAILED DESCRIPTION OF INVENTION

Figure 1:
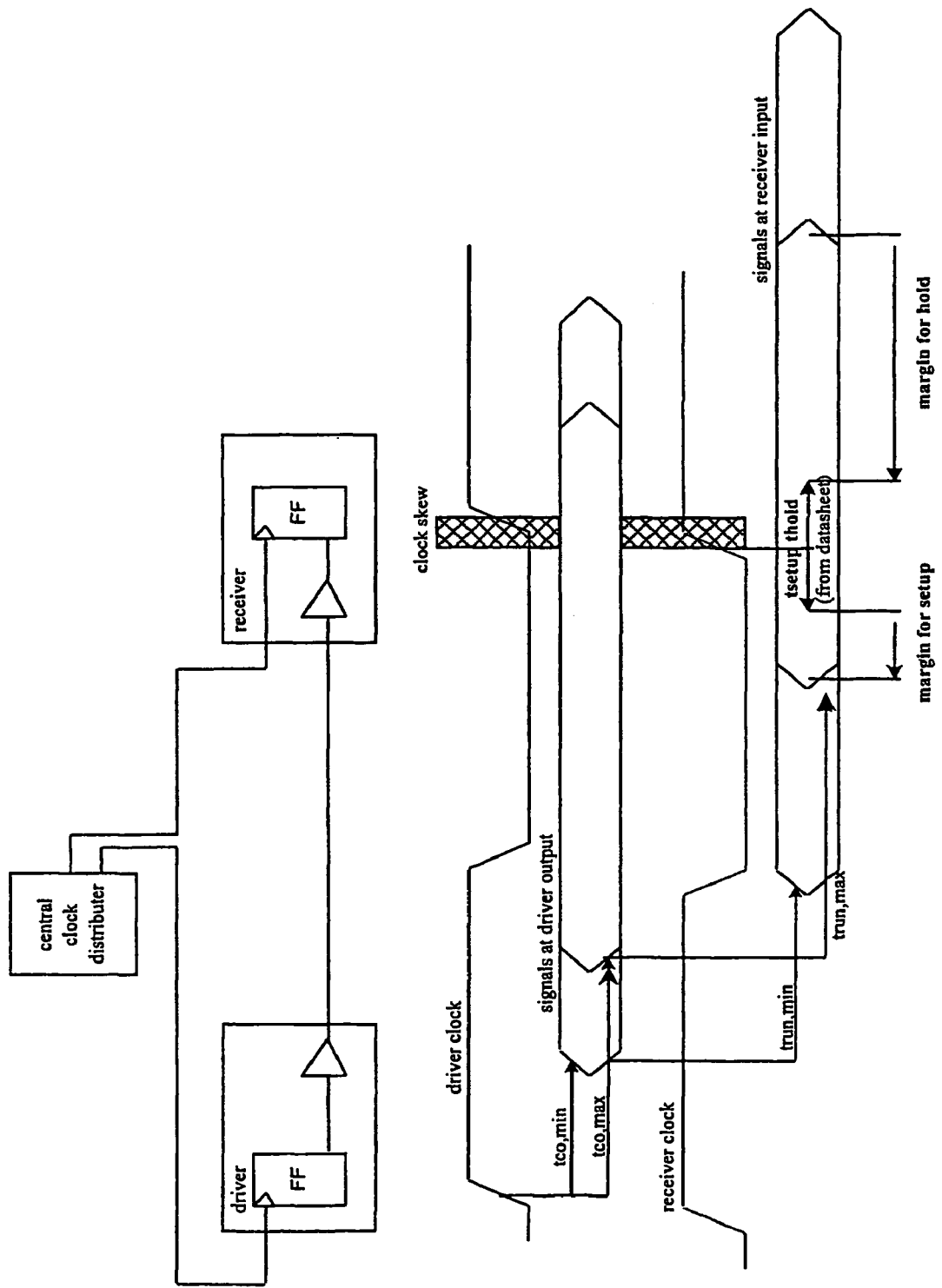
FIG. 1. shows the timing of a digital signal at the output of the driver of a transmitter and at the input of the receiver, FIG. 2. shows an already partly common variant for minimizing the clock skew between transmitter and receiver using a PLL in the transmitter device, FIG. 3. shows a schematic circuit diagram of a clock, and FIG. 4. shows an SDRAM memory controller comprising an ASIC, 4×512 MB SDRAM DIMMs.
Figure 2:
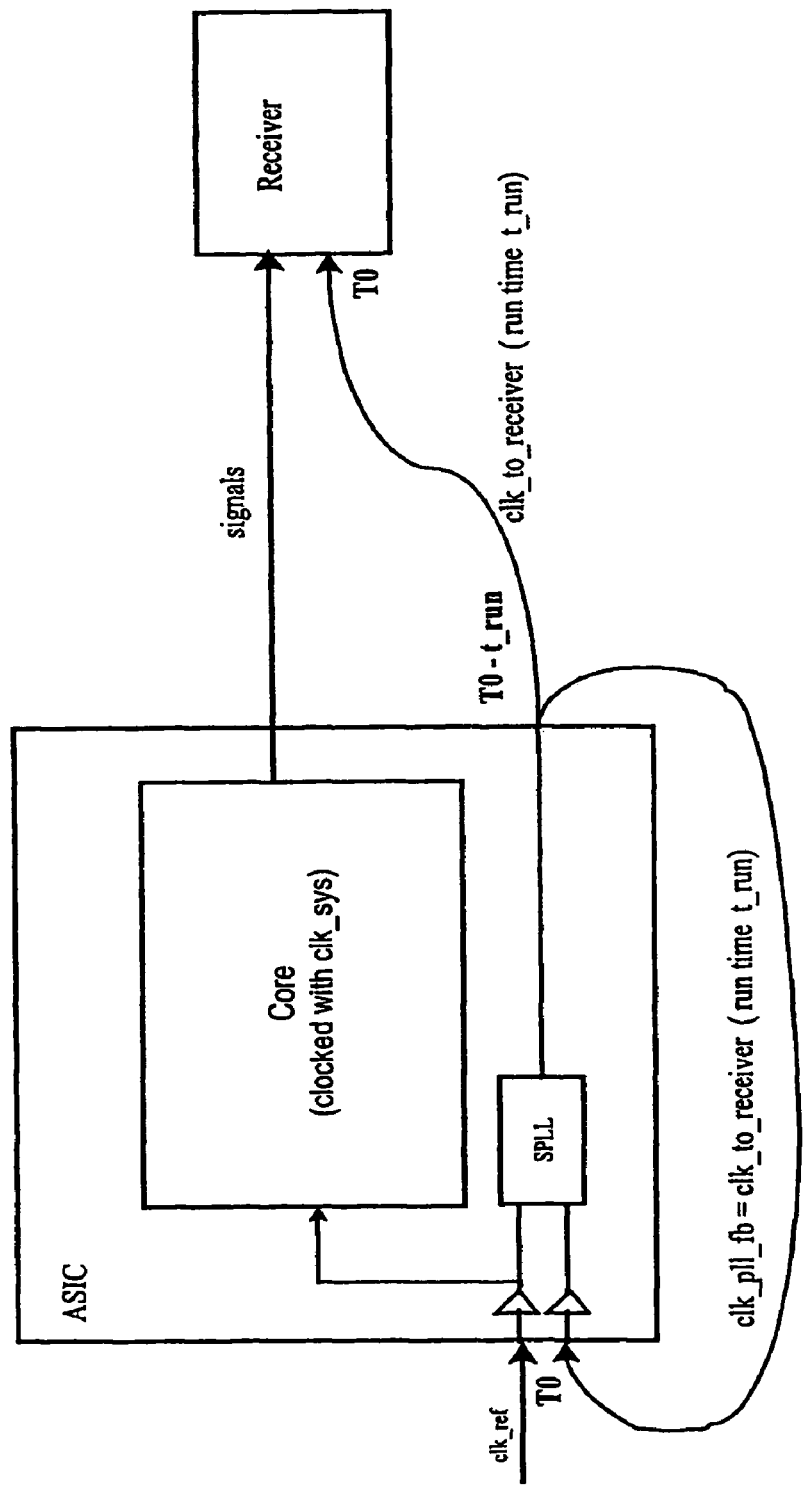
Figure 3:
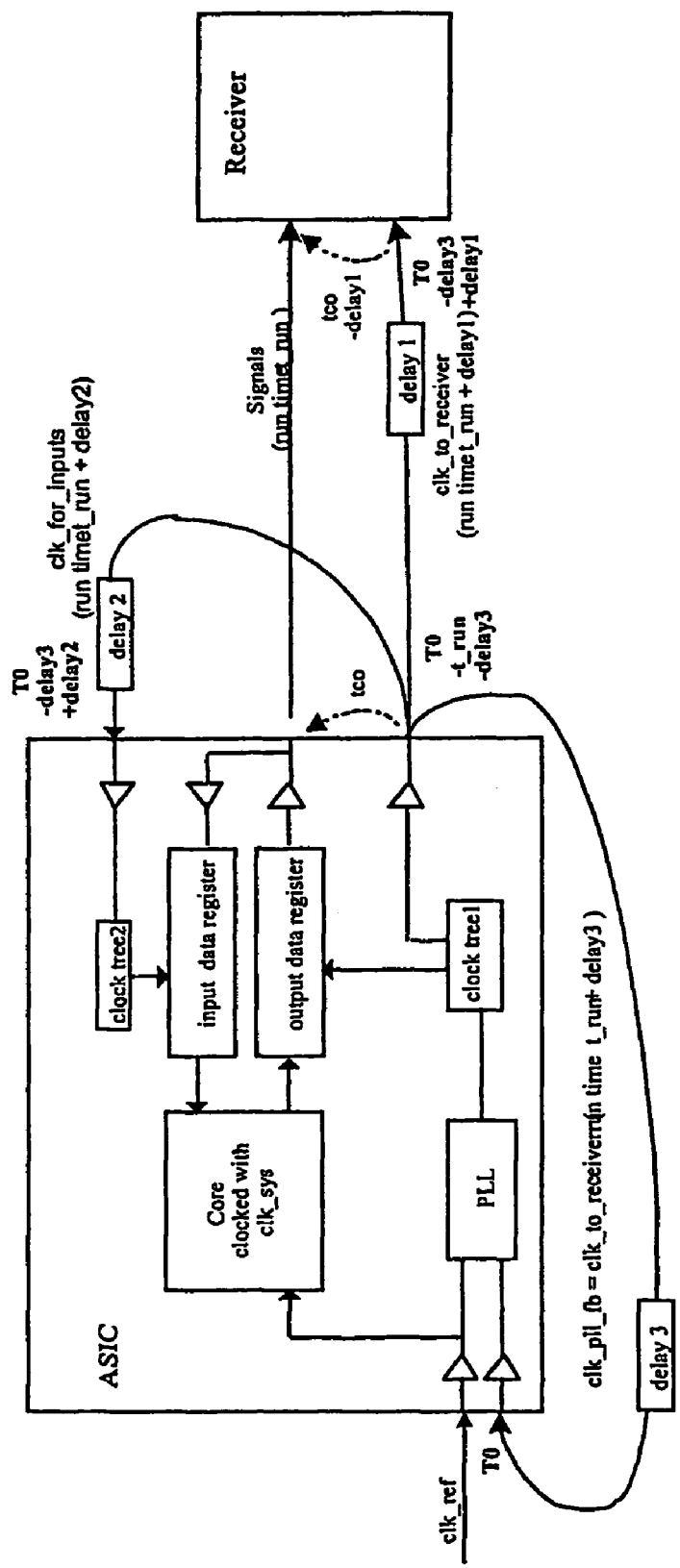
Figure 4:
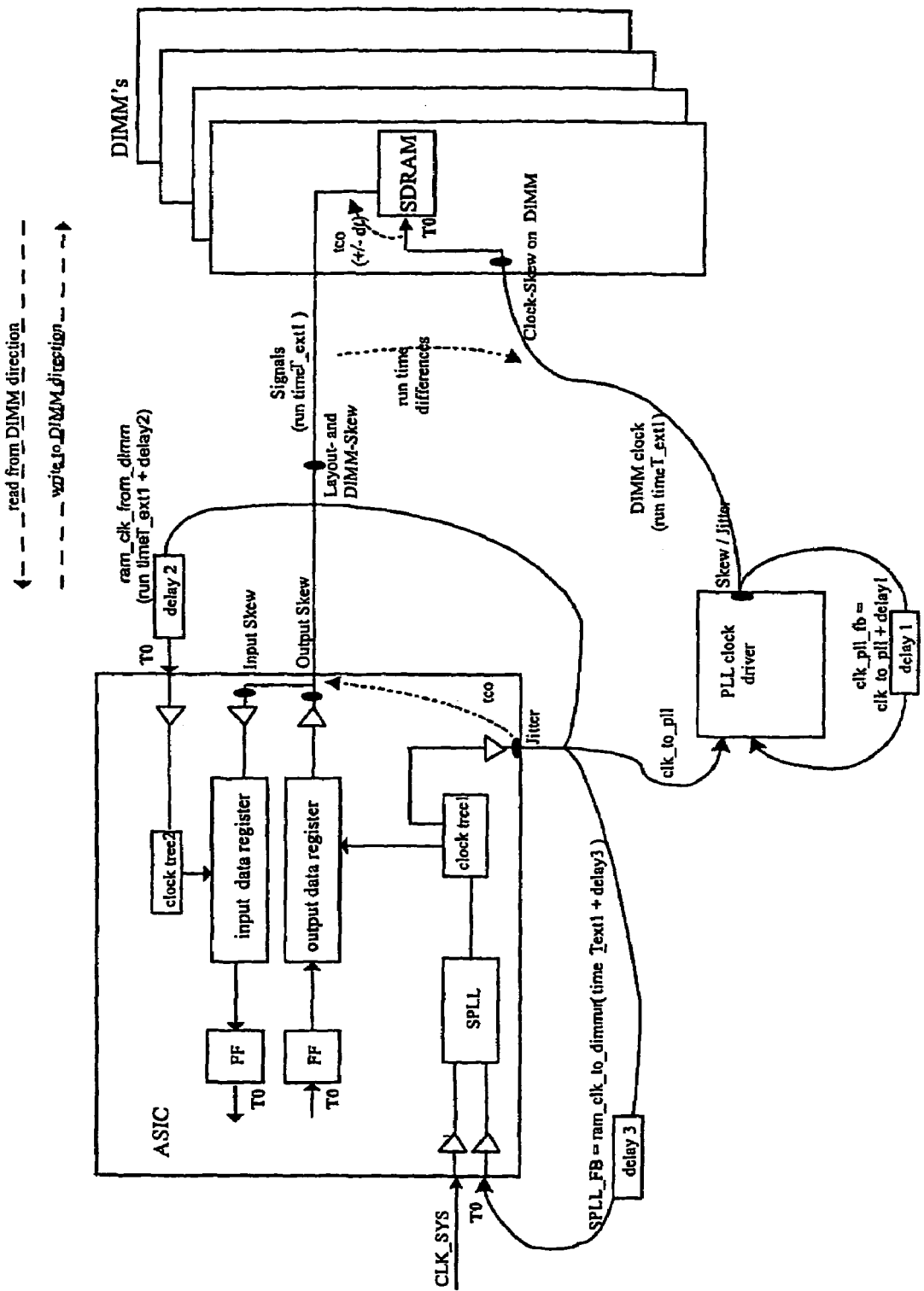

The principle presented is realized by way of example in an SDRAM memory controller comprising an ASIC, 4×512MB SDRAM DIMMs (see FIG. 4).

If the delay lines are initially regarded as not present, then all the clock edges at the ASIC input and at the DIMMs are locked in phase (TO).

The clock of the DIMMs can be shifted by means of delay 1. An increase means that the DIMM clock is leading, which serves to comply with the hold time. Coupling the output signals to the output clock ensures there is an adequate budget for setup compliance.

The clocking in of the reverse direction signals can be delayed by means of delay 2. Because the clock-to-output time for SDRAMs is relatively high at 5.6 ns (the entire clock period only has 7.5 ns!), this is very necessary.

The entire clock system can be shifted forward by means of delay 3.

In addition to the schematic circuit diagram shown in (3), a PLL clock driver is also installed. This multiplies the output clock of the ASIC in order to obtain 16 clocks for the 4 DIMMs. In this case delay 1 is shifted into the feedback path in order to achieve a forward shift of the DIMM clocks (hold time problem was the determining factor here). The run time up to the PLL clock driver is balanced out with the run time of its feedback path. The run time from the PLL clock driver to the DIMMs is set equal to t_ext1, the run time of ASIC feedbacks and signals to the DIMM.

In this way it is possible, in spite of special requirements not present in the PC environment (4 DIMM slots with angled, widely spaced sockets due to low board form factor height of 3 cm), to implement a bus clock rate of 133 MHz with reliable timing and without performance penalties for the system.

| Abbreviations used | |
|---|---|
| DIMM: | Dual Inline Memory Module |
| DRAM: | Dynamic Random Access Memory |
| SDRAM: | Synchronous Dynamic Random Access Memory |
| DDR SDRAM: | Double Data Rate Synchronous Random Access Memory |
| PLL: | Phase Locked Loop |
| SPLL: | PLL for SDRAM |
| Skew: | Angled position, distortion |
| Clock skew: | Time difference arising due to run times of different lengths and/or due to different driver strengths or receiver loads. Clock skew causes some receiver registers to switch earlier/later than others. |
| Output skew: | The dispersion range of the tco times with related signals of the same type (buses) |
| Input skew: | The dispersion range of the input run times from the external pin to the receiver in the chip with buses |

The invention claimed is:

1. A digital system, comprising:
a processing core device for processing first data which is clocked via a first clock signal;
a data output register for transmitting second data over a data signal line to a further digital system;

a data input register for receiving third data via the data signal line;

a PLL device which generates a second clock signal from the first clock signal;

a feedback loop of the PLL device that has the same run time as the data signal line;

a first clock line that supplies the second clock signal as a clock signal to the further digital system, whereby the first clock line has a similar physical length as the data signal line and contains a first delay device adjust the run time over the first clock line; and a second clock line that supplies the second clock signal to the data input register as a clock signal, whereby the second clock line contains a second delay device adjust the run time over the second clock line.

2. The digital system according to claim 1, wherein the feedback loop of the PLL device contains a third delay device adjust the run time of the feedback loop of the PLL device.

3. The digital system according to claim 1, wherein the second clock line has the same physical length as the data signal line.

4. The digital system according to claim 1, wherein the second clock signal is supplied as a clock signal to the data output register.

5. The digital system according to claim 1, wherein the run times within the digital system and buffer types of clock signals and data signals are identical.

6. A digital system, comprising:

a processing core device for processing first data which is clocked via a first clock signal;

a data output register for transmitting second data over a data line to a further digital system;

a data input register for receiving third data via the data line;

a PLL device which generates a second clock signal from the first clock signal;

a first delay device disposed in a first clock line between the digital system and the further digital system that enables the delivery of the second clock signal to the further digital system to be delayed by a first time interval;

a second delay device disposed in a second clock line that enables the delivery of the second clock signal to the data input register of the digital system to be delayed by a second time interval; and a third delay device disposed in a feedback loop of the PLL device that enables the second clock signal to be shifted to lead in time by a third time interval with respect to the first clock signal.

7. The digital system according to claim 6, wherein the second clock line has the same physical length as the data signal line.

8. The digital system according to claim 6, wherein the second clock signal is supplied as a clock signal to the data output register.

9. The digital system according to claim 6, wherein the second clock signal is supplied as a clock signal to the data input register.

10. The digital system according to claim 6, wherein the run times within the digital system and buffer types of clock signals and data signals are kept identical.

* * * * *